F. H. MOYER.
WIRE WHEEL.
APPLICATION FILED SEPT. 18, 1915.

1,179,646.

Patented Apr. 18, 1916.
2 SHEETS—SHEET 1.

Witnesses:

Inventor.
Fredellia H. Moyer
By
Attorneys.

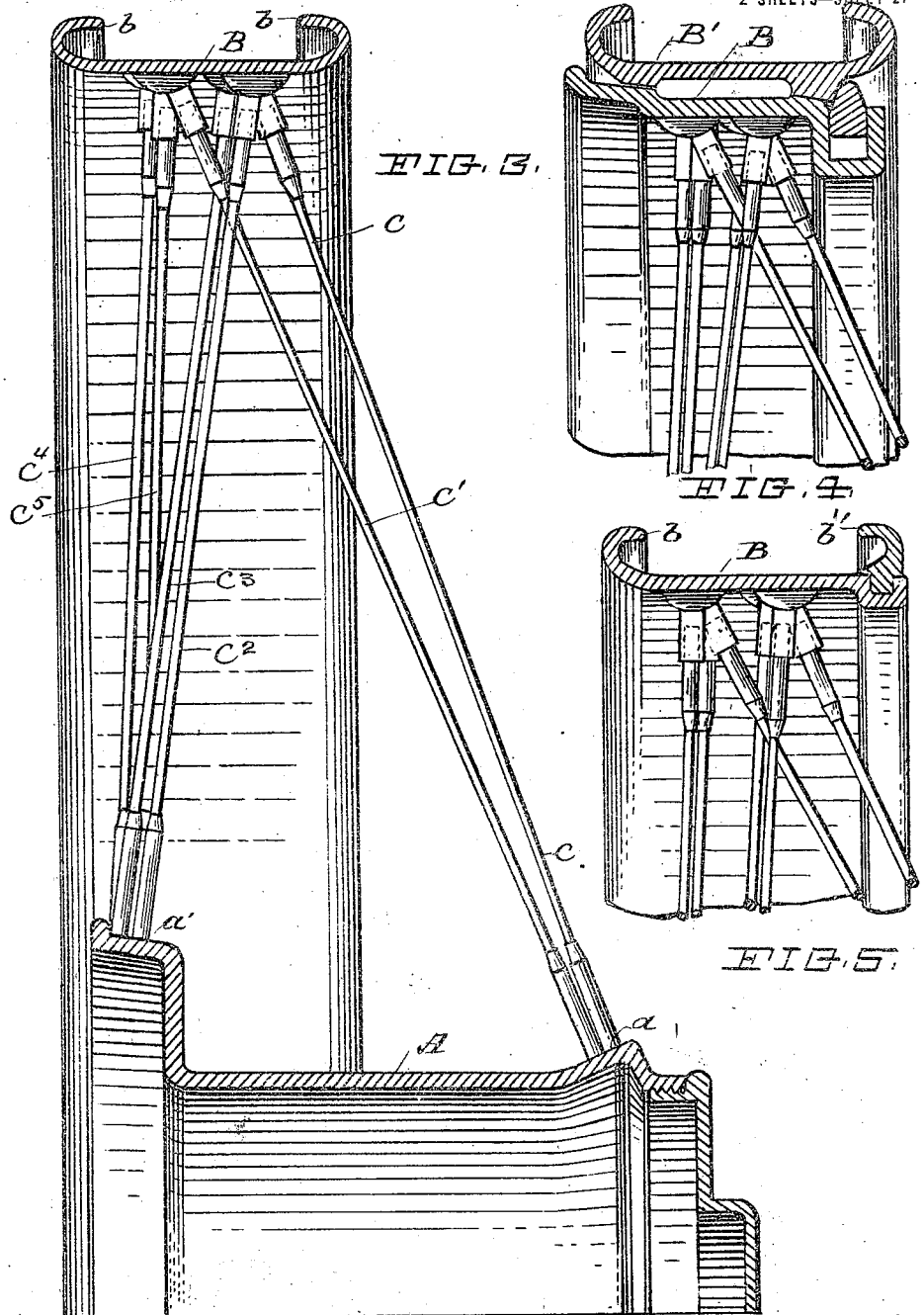

UNITED STATES PATENT OFFICE.

FREDELLIA H. MOYER, OF EUCLID HEIGHTS VILLAGE, OHIO.

WIRE WHEEL.

1,179,646.  Specification of Letters Patent. Patented Apr. 18, 1916.

Application filed September 18, 1915. Serial No. 51,503.

*To all whom it may concern:*

Be it known that I, FREDELLIA H. MOYER, a citizen of the United States, and resident of Euclid Heights Village, in the county of Cuyahoga and State of Ohio, have invented certain new and useful Improvements in Wire Wheels, of which I hereby declare the following to be a full, clear, and exact description, such as will enable others skilled in the art to which it appertains to make and use the same.

The objects of the invention are to provide improvements in metal wheels having wire spokes and employed in automobiles and other vehicles and the objects of the invention are to so arrange and position the several wire spokes and groups of wire spokes that all strains thereon will be uniformly transmitted to the front and rear of the metallic band comprising the felly or fixed rim of the wheel, also to overcome the tendency to lateral distortion and to maintain the amount of tension as uniformly as possible upon all spokes. Further, to distribute the load equally and uniformly to the rim member and also to prevent the several spokes from touching and rubbing upon each other. These various objects are obtained by means of specific forms of construction including the manner of arranging the spokes which are directed alternately to the front and to the rear, about the entire circumference of the metallic band in inclined series.

The invention further includes the combination and arrangement of parts and construction of details as hereinafter described, illustrated in the accompanying drawings and specifically pointed out in the claims.

Figure 1:
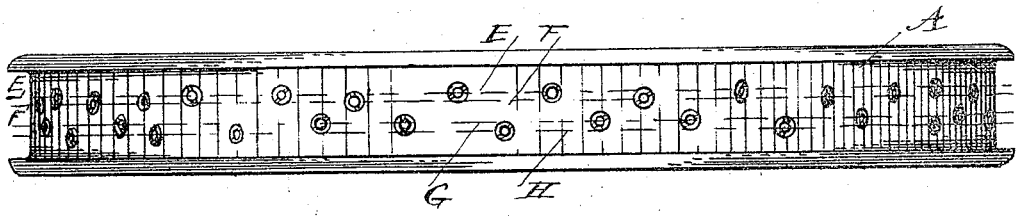
Figure 2:
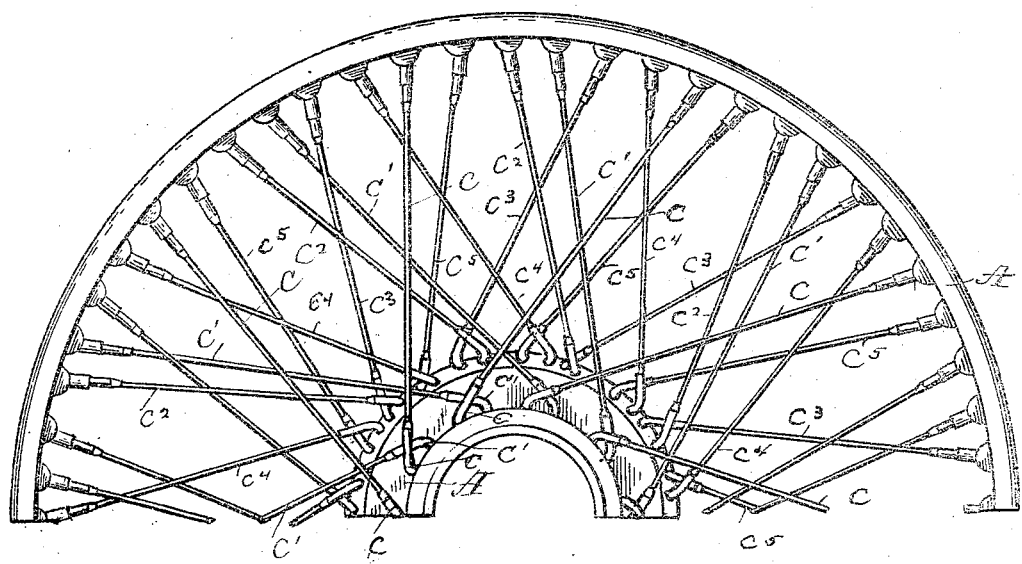

In the accompanying drawings Figure 1 is a plan view of the metallic felly rim showing the spaced positions of the extremities of the spokes in four circumferential lines therein; Fig. 2 is a front elevation of the wire wheel showing the spokes and the metallic hub and metallic felly or felly band; Fig. 3 is a longitudinal central section enlarged of the hub and band showing one spoke of each series brought into a single plane, an individual clencher rim and felly band combined in one band; Fig. 4 is a similar section showing a separate felly band and a demountable tire holding rim thereon; Fig. 5 is a similar section showing a felly band having a quickly detachable tire retaining rim and ring thereon.

In these views A is the hub preferably having the inclined front or outer flange $a$ and the inner inclined annular projection or flange $a'$, in which the spokes are secured; B is the felly or felly band in which the spokes are directly secured, and which may be provided with tire holding means, such as clencher edges $b$, $b$, as shown in Figs. 1 and 3, or with one clencher edge $b$, and a detachable split ring $b'$ as shown in Fig. 5, or a separate demountable tire holding rim B' can be sleeved over the felly band if desired as shown in Fig. 4. The spokes are arranged in diverging groups including six series inclined to the axis of the wheel. The number of spokes in each series will depend upon the size of the wheel and load requirements.

C, C, are groups or series of spokes which run from the front of the band to the front of the hub and C', C' are series of spokes which run from the rear of the band to the front of the hub, and tangentially in opposite directions to the series C, thus bracing them against strains of all kinds to which spokes may be subjected.

$C^2$, $C^2$ are series of spokes which run from the front of the band to the rear of the hub and $C^3$, $C^3$ are similar spokes which also run from the front of the band to the rear of the hub, but run tangentially in opposite directions to series $C^2$ as shown in Fig. 2. The number of spokes in the series or groups leading to the rear of the hub is greater than the entire number of spokes leading to the front of the hub, owing to the lesser angle of inclination to the axis of the wheel of the spokes comprising the series leading to the front of the hub. Series $C^4$ and $C^5$ are spokes running from the rear of the hub to the rear of the band and tangentially in opposite directions. This has the effect of counteracting the tendency to increase when tightening the amount of tension in any front series of spokes due to the difference in inclination of the series. This arrangement accomplishes the important results of overcoming any tendency to lateral distortion of the wheel by means of suitable bracing, and keeps the amount of strain uniform in all of the spokes, and further distributes the load equally upon the rim, so that the rim or band cannot become distorted circumferentially. This construction also has the very great advantage that the rims thus braced can be made of lighter material, since there is less tendency to distortion of the wheel, the balance of tension being preserved. All spokes are arranged substantially at a tangent to the hub and alternate spokes run in opposite tangential directions thus imparting a direct longitudinal strain upon each spoke as the wheel is rotated or carries its load, and counteracts the torsional action of the hub. The increased number of the rear series of spokes also increases the support under the load upon the wheel. This load comes upon the nearly vertical rear spokes more than upon the inclined front spokes. The ends of the spokes where attached to the rim or band are positioned in four circumferential lines E, F, G and H respectively, see Fig. 1, and alternately in one row and another so as to separate their ends laterally to prevent any danger of the spokes interfering while the wheel is in use, and rubbing upon each other, thus making them much more durable and efficient.

This wheel contains no vertical spokes but all are inclined to the vertical plane of the wheel, whereby all spokes are caused to sustain a portion of the side strain upon the wheel and the strain is distributed thereover.

Having described the invention what I claim as new and desire to secure by Letters Patent is:

1. A wheel of the character described, including a metallic hub having an annular flange upon its rear end, and an inclined annular face near its front end, in combination with a metal band or rim and six spaced series of wire spokes connecting said band and hub, one series extending from the front of the band to the front of the hub, another series extending from the rear of the band to the front of the hub, and other series extending alternately from the front and rear of the band to the rear of the hub.

2. A wheel of the character described, including a metallic hub having an annular flange upon its rear end, and an inclined annular face near its front end, in combination with a metal band or rim and six spaced series of wire spokes connecting said band and hub, one series extending from the front of the band to the front of the hub, another series extending from the rear of the band to the front of the hub, and other series which extend alternately from the front and rear of the band to the rear of the hub, the ends of the spokes being positoined alternately in one of four spaced circumferential lines in said band, whereby they are maintained out of chafing contact with each other.

3. In combination, in a metal wheel, a band or rim and a hub having an annular flange upon its rear end, and an inclined annular surface near its front end, of six series of wire spokes connecting said rim and hub, said series arranged in as many diverging groups and inclined to the central plane of the wheel in opposite directions, and the series at the rear edge of the the hub being the most nearly vertical and greater in number than the other series, to counteract an increased amount of pressure and tension therein, all spokes being substantially at a tangent to the smaller periphery of the hub, and extending alternately in opposite tangential directions.

4. In combination in a metal wheel with a metallic band and a metallic hub, said hub having points of attachment at its front and rear circumferences, of six separate series of wire spokes connecting said band and hub, and having their outer ends positioned alternately in one of four circumferential lines in said band, one series extending from the front of the band to the front of the hub, another series extending from the rear of the band to the front of the hub, and another series extending alternately from the front and rear of the band to the rear of the hub, said series extending to the rear of the hub being greater in number than the series extending to the front of the hub.

In testimony whereof, I hereunto set my hand this 14th day of Sept., 1915.

FREDELLIA H. MOYER.

In presence of—
 RALPH W. JEREMIAH,
 WM. M. MONROE.

Copies of this patent may be obtained for five cents each, by addressing the "Commissioner of Patents, Washington, D. C."